United States Patent
Hu et al.

(10) Patent No.: US 9,307,259 B2
(45) Date of Patent: Apr. 5, 2016

(54) IMAGE DECODING METHODS AND IMAGE DECODING DEVICES

(71) Applicant: MediaTek Singapore Pte. Ltd., Singapore (SG)

(72) Inventors: Wei Hu, Beijing (CN); Minxue Liang, Beijing (CN)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 0 days.

(21) Appl. No.: 14/159,086

(22) Filed: Jan. 20, 2014

(65) Prior Publication Data

US 2014/0301655 A1 Oct. 9, 2014

(30) Foreign Application Priority Data

Apr. 8, 2013 (CN) .......................... 2013 1 0119656

(51) Int. Cl.
- *G06K 9/64* (2006.01)
- *H04N 19/426* (2014.01)
- *H04N 19/44* (2014.01)

(52) U.S. Cl.
CPC ................ *H04N 19/426* (2014.11); *G06K 9/64* (2013.01); *H04N 19/44* (2014.11)

(58) Field of Classification Search
CPC ......... G06T 3/4084; G06T 9/007; G06T 9/40; G06T 3/40; H03M 7/40; H03M 7/3082; H03M 7/3079; G06F 17/147; G06F 3/0481; H04N 19/00278; H04N 5/46; H04N 19/00533; H04N 19/00775; H04N 21/435; H04N 21/4728
USPC .......... 382/233, 240, 248, 252; 348/453, 441, 348/443, 444, 448, 450
See application file for complete search history.

(56) References Cited

U.S. PATENT DOCUMENTS

| | | | | |
|---|---|---|---|---|
| 5,321,776 A | * | 6/1994 | Shapiro | H04N 19/647 358/1.9 |
| 5,603,012 A | * | 2/1997 | Sotheran | G06F 9/3867 370/450 |
| 5,835,740 A | * | 11/1998 | Wise | G06F 9/3867 375/E7.093 |
| 6,188,730 B1 | * | 2/2001 | Ngai | H04N 9/64 348/441 |
| 6,831,949 B1 | * | 12/2004 | Brightwell | H04N 7/52 375/240 |
| 2002/0003905 A1 | * | 1/2002 | Sato | G06T 5/10 382/240 |
| 2003/0081850 A1 | * | 5/2003 | Karczewicz | H04N 19/176 382/247 |
| 2003/0156652 A1 | * | 8/2003 | Wise | G06F 9/3867 375/240.26 |
| 2004/0151253 A1 | * | 8/2004 | Bossen | G06T 9/07 375/243 |
| 2005/0129387 A1 | * | 6/2005 | Kishi | H04N 5/783 386/344 |

(Continued)

*Primary Examiner* — Vu Le
*Assistant Examiner* — Aklilu Woldemariam
(74) *Attorney, Agent, or Firm* — McClure, Qualey & Rodack, LLP (57) ABSTRACT

Image decoding methods are provided. First, an input bitstream corresponding to an image is acquired and an entropy decoding operation is performed on a block to be decoded in the input bitstream to obtain a decoding result, wherein the decoding result includes at least one coefficient having a corresponding block position information and coefficient value. It is then determined whether the coefficient value of the at least one coefficient is zero. When the coefficient value of the at least one coefficient is not zero, the at least one coefficient is determined as an non-zero coefficient and the block position information and coefficient value corresponding to the non-zero coefficient are stored to an external storage device. When the coefficient value of the at least one coefficient is zero, the block position information and coefficient value corresponding to the at least one coefficient are not stored.

14 Claims, 7 Drawing Sheets

(56) References Cited

U.S. PATENT DOCUMENTS

| | | | |
|---|---|---|---|
| 2006/0146936 A1* | 7/2006 | Srinivasan | H04N 19/00121 375/240.18 |
| 2007/0036223 A1* | 2/2007 | Srinivasan | H03M 7/46 375/240.18 |
| 2007/0177813 A1* | 8/2007 | Yang | H04N 19/597 382/233 |
| 2008/0152002 A1* | 6/2008 | Haque | H04N 19/61 375/240.12 |
| 2009/0002379 A1* | 1/2009 | Baeza | G06T 1/20 345/522 |
| 2009/0003447 A1* | 1/2009 | Christoffersen | H04N 19/61 375/240.16 |
| 2010/0054619 A1* | 3/2010 | Alshin | H04N 19/126 382/252 |
| 2010/0067574 A1* | 3/2010 | Knicker | G06T 5/002 375/240.12 |
| 2011/0026593 A1* | 2/2011 | New | H03M 7/42 375/240.12 |
| 2011/0194613 A1* | 8/2011 | Chen | H04N 19/176 375/240.24 |
| 2011/0243220 A1* | 10/2011 | Seregin | H04N 19/129 375/240.02 |
| 2011/0249755 A1* | 10/2011 | Shibahara | H04N 19/61 375/240.18 |
| 2011/0299788 A1* | 12/2011 | Suzuki | H04N 19/176 382/233 |
| 2012/0170857 A1* | 7/2012 | He | H04N 19/50 382/233 |
| 2013/0107970 A1* | 5/2013 | Wang | H04N 19/176 375/240.18 |
| 2013/0114731 A1* | 5/2013 | Lee | H04N 19/00775 375/240.18 |
| 2014/0210652 A1* | 7/2014 | Bartnik | H03M 7/40 341/67 |

* cited by examiner

IMAGE DECODING METHODS AND IMAGE DECODING DEVICES

CROSS REFERENCE TO RELATED APPLICATIONS

This Application claims priority of China Patent Application No. 201310119656.0, filed on Apr. 08, 2013, the entirety of which is incorporated by reference herein.

BACKGROUND OF THE INVENTION

1. Field of the Invention

The disclosure relates generally to decoding methods and related decoding devices, and more particularly to image decoding methods and image decoding devices for decoding video images/pictures.

2. Description of the Related Art

Recently, portable devices, such as mobile or handheld devices, have become more and more technically advanced and multifunctional. For example, a mobile device may receive email messages, have an advanced address book management application, allow media playback, and have various other functions. Because of the conveniences of devices with multiple functions, the devices have become necessities of life. Due to the increasing capacity of mobile devices such as smart phones to support image and video specifications, such as video capture and playback capability supporting video quality up to 720P or even 1080P, a greater demand for embedded processors on mobile devices with coding and decoding capacity as far as high-specification video/picture contents are concerned.

For mobile devices with embedded processors, during performing the video image/picture decoding, partial decoded messages are typically first stored in an external storage device such as memory and then are read from the external storage device during subsequent processing for reconstruction of the video image or picture. To read these messages, frequent data reading/writing on an external storage device are often needed. As the operating frequency of the external storage device is lower, the data bandwidth size between the processor and external storage device often determines the speed. For example, when decoding 1080P high-definition video images, due to the large volume of the video image data, reading/writing on the external storage device is frequently needed, thus the considerably high reading/writing bandwidth ratios in proportion to the total bandwidth, for example, at the bandwidth of 1G bytes/sec or higher. Such high bandwidth requirement, however, may easily become a bottleneck of decoding speed enhancement.

It is therefore a desire to provide methods for efficiently reducing bandwidth required by the embedded processor to perform video images/pictures decoding.

BRIEF SUMMARY OF THE INVENTION

Image decoding methods and devices are provided.

In one embodiment, an image decoding method comprises the following steps. First, an input bitstream corresponding to an image is acquired and an entropy decoding operation is performed on a block to be decoded in the input bitstream to obtain a decoding result, wherein the decoding result includes at least one coefficient having a corresponding block position information and coefficient value. It is then determined whether the coefficient value of the at least one coefficient is zero. When the coefficient value of the at least one coefficient is not zero, the at least one coefficient is determined as an non-zero coefficient and the block position information and coefficient value corresponding to the non-zero coefficient are stored to an external storage device. When the coefficient value of the at least one coefficient is zero, the block position information and coefficient value corresponding to the at least one coefficient are not stored.

An embodiment of an image decoding device includes a storage device and at least one processor. The at least one processor is arranged for acquiring an input bitstream corresponding to an image, performing an entropy decoding operation on data of a block to be decoded in the input bitstream to obtain a decoding result, wherein the decoding result includes at least one coefficient having a corresponding block position information and coefficient value, determining whether the coefficient value of the at least one coefficient is zero, when the coefficient value of the at least one coefficient is not zero, determining the at least one coefficient as an non-zero coefficient and storing the block position information and coefficient value corresponding to the non-zero coefficient to the storage device, and when the coefficient value of the at least one coefficient is zero, not storing the block position information and coefficient value corresponding to the at least one coefficient.

The image decoding devices and related image decoding methods are applicable for most video-formatted images and pictures decoding, which effectively reduces the amount of data reading from or writing to the external storage device and enhances the decoding speed. The image decoding methods may take the form of a program code embodied in a tangible media. When the program code is loaded into and executed by a machine, the machine becomes an apparatus for practicing the disclosed method.

BRIEF DESCRIPTION OF THE DRAWINGS

The invention will become more fully understood by referring to the following detailed description with reference to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

In conventional video decoding, access of coefficients after entropy decoding is done with blocks as units. Every time a coefficient is decoded, the coefficient value is written into the position that the block position information points to in the block. On the other hand, for use in subsequent reconstruction procedures, the coefficients are read and processed using blocks as units. With embodiments of the image decoding methods of the invention, for every symbol (non-zero coefficient) decoded through entropy decoding, the corresponding block position information and coefficient value are stored in the data arrays rather than writing the coefficient value in the block, and the number of non-zero coefficients decoded by each block is recorded to generate an auxiliary message. Thereafter, when there is a need to store coefficient messages of multiple macroblocks (MBs), the data array can be read from the external storage device and subsequent reconstruction procedures can then be performed based on the data arrays and auxiliary messages. As the position information and coefficient values are stored continuously, a large number of zero values within each block can be skipped, thereby efficiently reducing the data amount of data required to read from or write to an external storage device and the required bandwidth.

Figure 1:
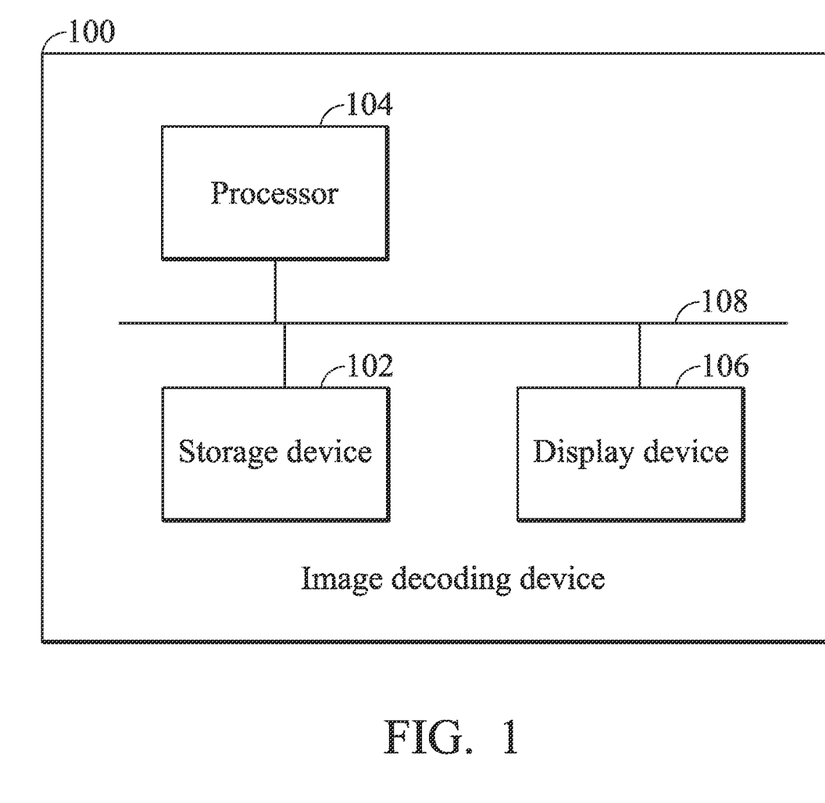
FIG. 1 is a schematic diagram illustrating an embodiment of an image decoding device of the invention.

FIG. 1 is a schematic diagram illustrating an embodiment of an image decoding device of the invention. As shown in FIG. 1, the image decoding device 100 at least comprises a storage device 102, at least one processor 104, and a display device 106. The image decoding device 100 can be any configuration of devices, such as a PDA (Personal Digital Assistant), a smart phone, a mobile phone, an MID (Mobile Internet Device, MID), a laptop computer, a car computer, a digital camera, a multi-media player, a game device, or any other type of mobile computational devices, however, it is to be understood that the invention is not limited thereto. The images can be video images or pictures compatible with any well-known video formats (e.g. H.264 standard format). The storage device 102 stores data required by a decoding procedure, such as decoding results after entropy decoding or the likes.

The storage device 102 may be any one of a combination of volatile memory elements (e.g., random-access memory (RAM, such as DRAM, and SRAM, etc.)) and nonvolatile memory elements and so on for the processor 104 to access data. The processor 104 may include a custom made or commercially available processor, a central processing unit (CPU) or an auxiliary processor among several processors, a semiconductor based microprocessor (in the form of a microchip), one or more application specific integrated circuits (ASICs), a plurality of suitably configured digital logical gates, single-core processor and multi-core processor and so one.

Figure 2:
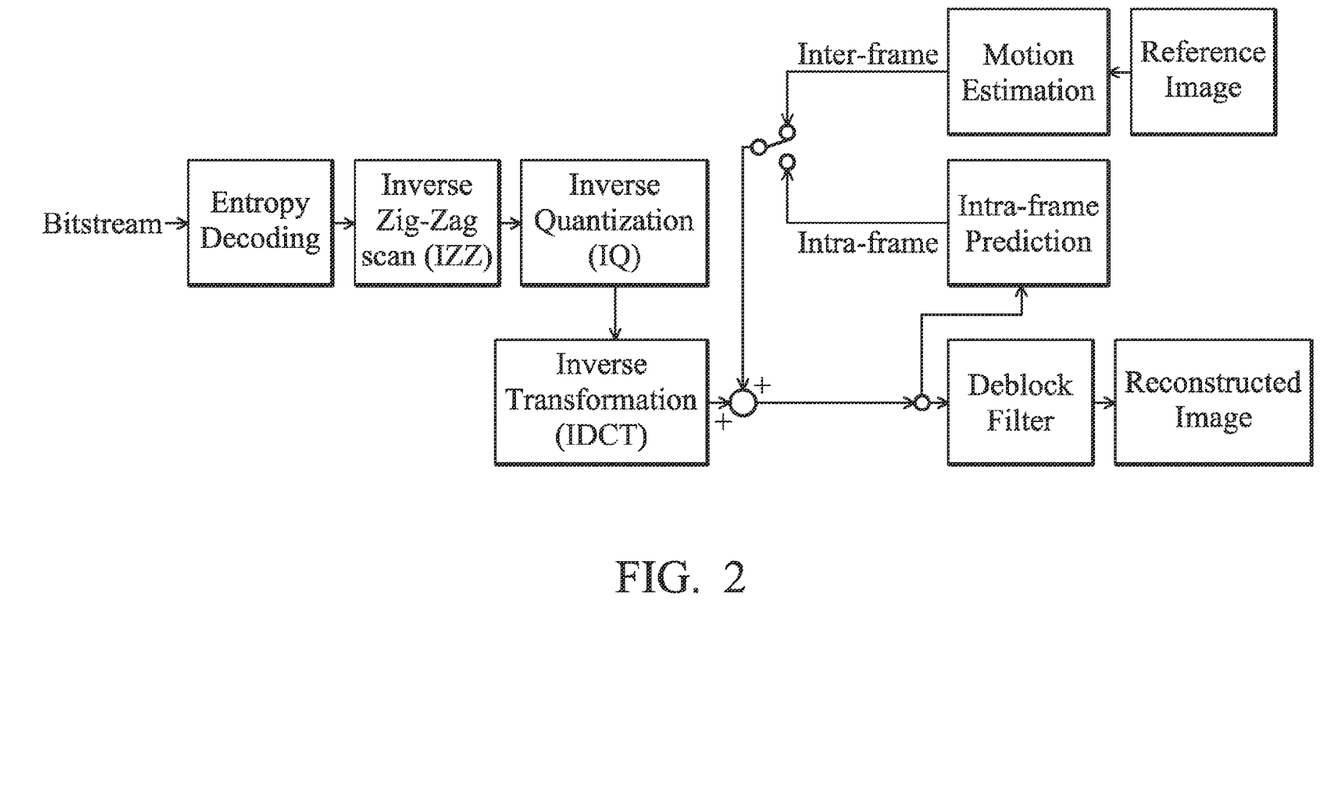
FIG. 2 is a schematic diagram illustrating an embodiment of a decoding procedure of the invention.

The processor 104 can perform decoding procedure in order to decode and reconstruct the original image from the coded input bitstream of one image (such as picture or video image). FIG. 2 is a schematic diagram illustrating an embodiment of a decoding procedure of the invention. As shown in FIG. 2, the processor 104 may first apply an entropy decoding operation to an encoded bitstream to decode multiple coefficients from each block to be decoded within the encoded bitstream. In particular, coefficients decoded through entropy decoding are also known as quantified residual coefficients. Coefficients decoded through entropy decoding by the processor 104 are known as symbols, which include the corresponding block position information and coefficient values. The block position information in the corresponding blocks is used to represent the positions of the coefficients in the blocks (e.g., blocks with a size of 4×4 or 8×8 pixels). After the entropy encoding, the processor 104 then performs subsequent reconstruction procedures, wherein the processor 104 may first utilize the coefficients decoded to restore the arrangement order of the block, perform an inverse Zig-Zag (IZZ) scanning to generate a scanned data, perform an inverse quantization (IQ) operation to generate an inverse-quantized data, and perform inverse transformation (IT) and other operations (such as: inverse discrete cosine transform (IDCT), motion estimation, intra-frame/inter-frame prediction and block filtering for reconstruction of the image so as to reconstruct the original image. It should be understood that, as the operation details of subsequent reconstruction procedures for reconstruction of the image in the decoding procedure, such as the inverse Zig-Zag (IZZ) scanning, the inverse quantization (IQ), the inverse transformation (IT), the motion estimation, the intra-frame/inter-frame prediction and block filtering and so on, are well-known in the art, and thus detail descriptions of which are omitted here for brevity.

The display device 106 can display video images/pictures reconstructed that are completely decoded by the processor 104. The storage device 102, the processor 104 and the display device 106 are coupled to a bus 108 such that the processor 104 can access data in the storage device 102 via the bus 108. The processor 104 can perform the image decoding method of the invention, which will be discussed further in the following paragraphs.

To be more specific, the processor 104 can obtain one bitstream through corresponding video images/pictures and then perform entropy decoding on the data of a block to be decoded in the input bitstream in order to obtain a decoding result. The decoding result may include a plurality of coefficients, wherein each coefficient has block position information and one coefficient value corresponding thereto. The processor 104 can then store the block position information and coefficient values of all the non-zero coefficients of coefficients for the decoding result to the storage device 102. It is understood that, the coefficient value of each coefficient may be zero or non-zero, while the non-zero coefficients refer to the coefficients with coefficient values other than zero.

After performing the entropy decoding, the processor 104 can then read the abovementioned two data arrays from the external storage device 102 in subsequent reconstruction procedures, as well as the auxiliary messages that contain the number of symbols in order to restore the arrangement model of each block and perform remaining operations such as the inverse Zig-Zag conversion, the inverse quantization, the inverse transformation (e.g., IDCT) and other operations to reconstruct the image. The display device 106 can display the video images/picture reconstructed by the processor 104 after the decoding procedure has been completed.

Figure 3:
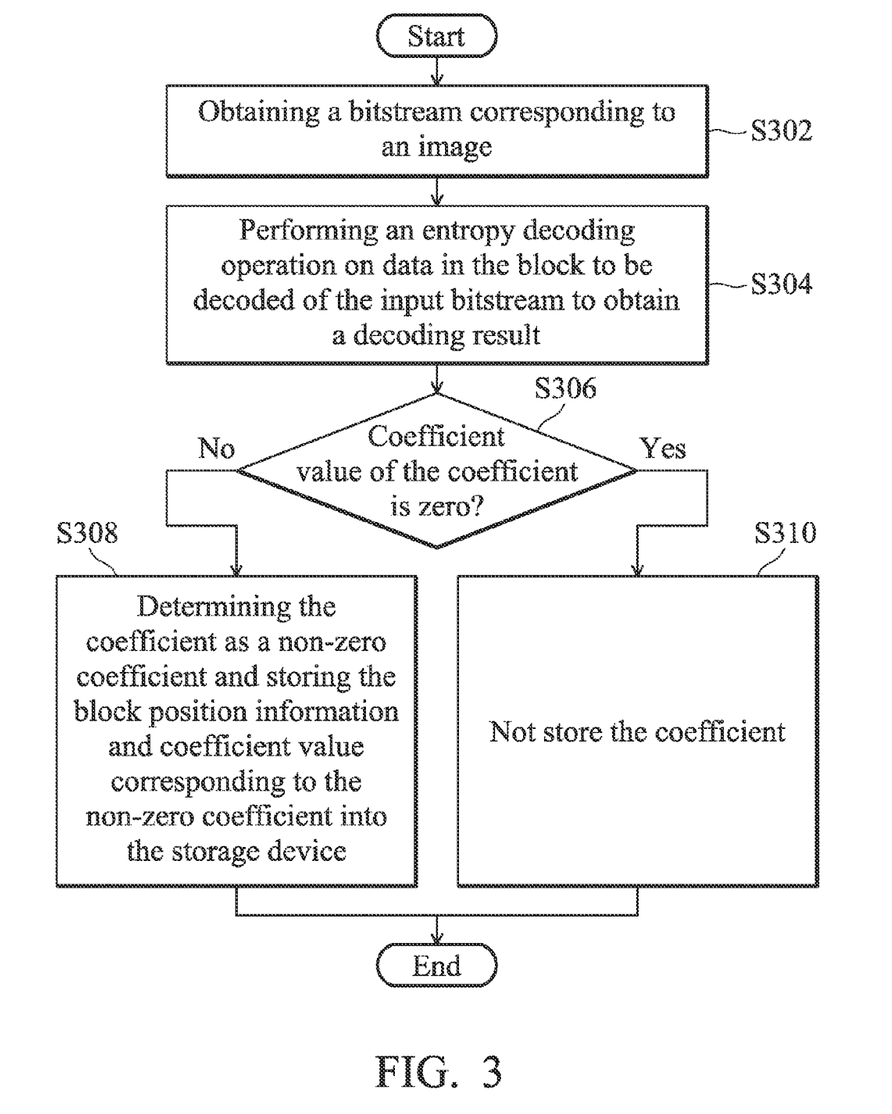
FIG. 3 is a flowchart of an embodiment of an image decoding method of the invention.

FIG. 3 is a flowchart of an embodiment of an image decoding method of the invention. The image decoding method can be used in an electronic device, such as the image decoding device 100 in FIG. 1, and can be performed by the processor 104 of the image decoding device 100. In this embodiment, the images are video images or pictures compatible with conventional video format standards (e.g. images compatible with the H.264 standard).

First, in step S302, a bitstream corresponding to the image is obtained. In particular, the input bitstream may contain data of multiple blocks to be decoded, and each block to be decoded has a specific size, such as 128×128, 64×64, 32×16, 16×16, 8×8, or 4×8 pixels.

Figure 4:
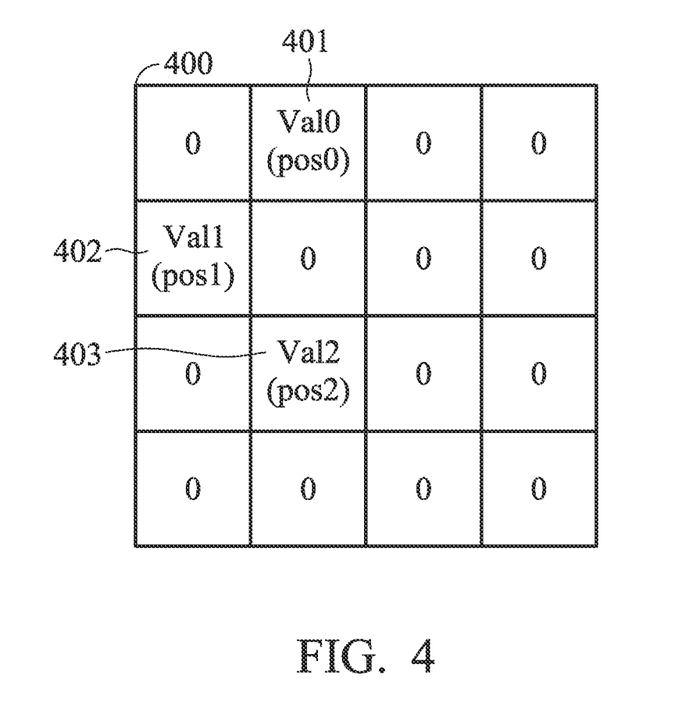
FIG. 4 is a schematic diagram illustrating an embodiment of a decoding result after performing the entropy decoding operation of the invention.

Then, in step S304, an entropy decoding operation is performed on the data in the block to be decoded from the input bitstream to obtain a decoding result, wherein the decoding result may contain a plurality of coefficients. There is corresponding block position information and one coefficient value in each coefficient. In particular, coefficients decoded by the entropy decoding operation are also known as quantified residual coefficients. For example, refer to FIG. 4, which is a schematic diagram illustrating an embodiment of a decoding result after performing the entropy decoding operation of the invention. As shown in FIG. 4, the decoding result 400 includes three non-zero coefficients 401, 402 and 403 with coefficient values that are not zero and multiple zero coefficients (coefficient values of the zero coefficients are zero). The coefficient values corresponding to the non-zero coefficients 401, 402, and 403 are Va10, Va11, and Va12, respectively and the corresponding block position information of the non-zero coefficients 401, 402, and 403 are pos0, pos1, and pos2, respectively. Note that the block position information of the non-zero coefficients 401 is pos0, which indicates that the coefficient value Va10 of the non-zero coefficient 401 is in the position pos0 within the block.

After obtaining the abovementioned decoding result upon completion of entropy decoding, in step S306, it is then determined whether or not the coefficient value of each coefficient within the decoding result is zero. When the coefficient value of the coefficient is not zero (No in step S306), i.e., the coefficient 401, in step S308, the coefficient is determined as a non-zero coefficient, and the block position information and coefficient value corresponding to the non-zero coefficient is stored in the storage device 102. For example, the coefficient value Va10 and the block position information pos0 of the non-zero coefficient 401 will be stored in the storage device 102.

Contrarily, when the coefficient value of a coefficient is zero (Yes in step S306), in step S310, it is determined to not store this coefficient. In this step, the zero coefficients in the decoding result are skipped, nor are they stored in the external storage device 102.

It should be noted that steps S306 to S310 will be repeatedly performed for all the coefficients within the blocks. Once a coefficient is determined to be a non-zero coefficient, the block position information and coefficient value corresponding to the non-zero coefficient will be stored in the storage device 102 until all the coefficients within a block have been checked. After all the coefficients within the block have been checked, aforementioned steps are then performed to check the next block.

In addition, auxiliary messages corresponding to the blocks to be decoded can be further generated to assist in subsequent residual block reconstruction procedures, wherein the auxiliary messages may include recording of which blocks the identifiable non-zero coefficients belong to, such as the starting address of each block, the number of non-zero coefficients, specific flags and so on. Therefore, in subsequent reconstruction procedures, the processor 104 may read the abovementioned data array which includes the block position information and the coefficient values corresponding to the non-zero coefficients from the storage device 102. Then, the processor 104 may reconstruct the residual blocks based on the block position information and coefficient values corresponding to non-zero coefficients read and auxiliary messages so as to reconstruct the original image.

Figure 5:
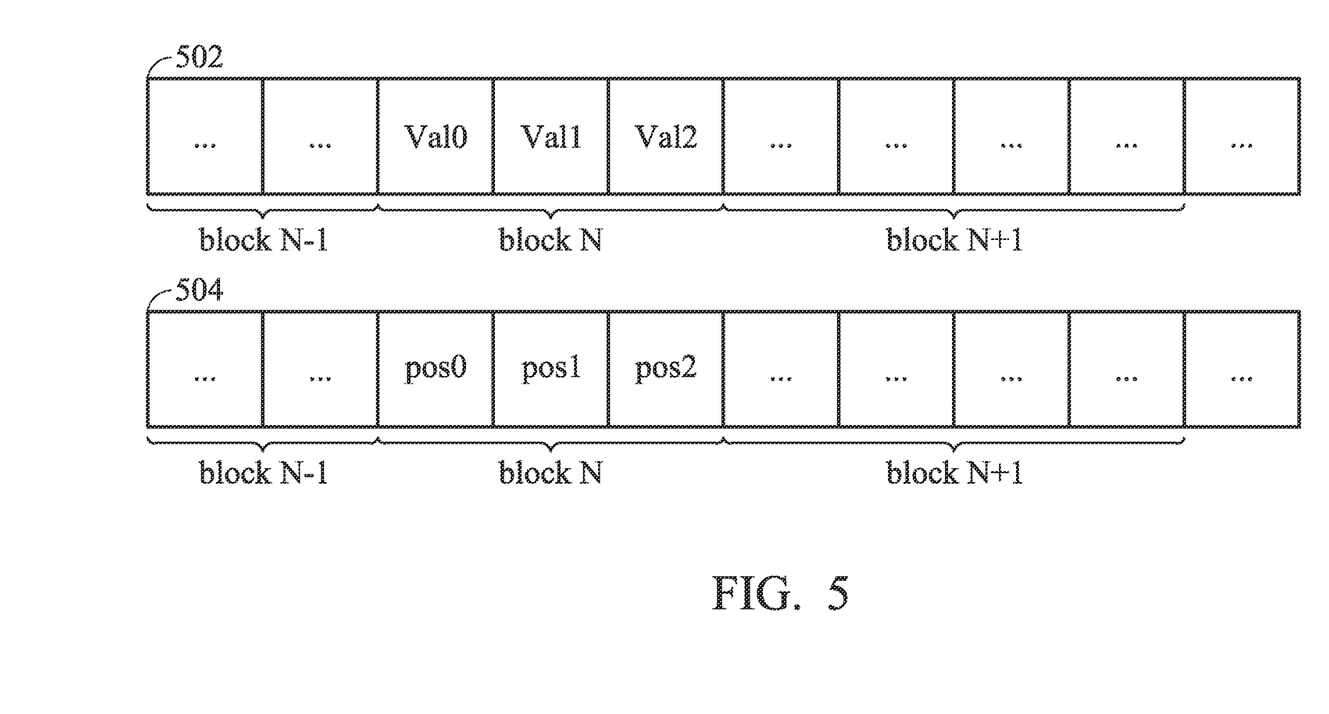
FIGS. 5 to 7 are schematic diagrams illustrating embodiments of stored data of the invention.

In some embodiments, the position information and the coefficient values corresponding to the non-zero coefficients are separately stored, wherein the block position information and coefficient values corresponding to the non-zero coefficients are separately stored into different data arrays of the storage device 102. For example, refer to FIG. 5, which is a schematic diagram illustrating an embodiment of stored data of the invention. As shown in FIG. 5, the first data array 502 is used to store the coefficient values of non-zero coefficients decoded from every block, while the second data array 504 is used to store the corresponding block position information of the non-zero coefficients decoded from every block, wherein the coefficient values of all the blocks are continuously stored, while the block position information of all the blocks are also continuous and are stored correspond to the coefficient values. In this embodiment, when subsequent reconstruction procedures are required, the processor 104 can refer to the data arrays 502 and 504 simultaneously and reconstruct the residual blocks based on the auxiliary messages.

Figure 6:
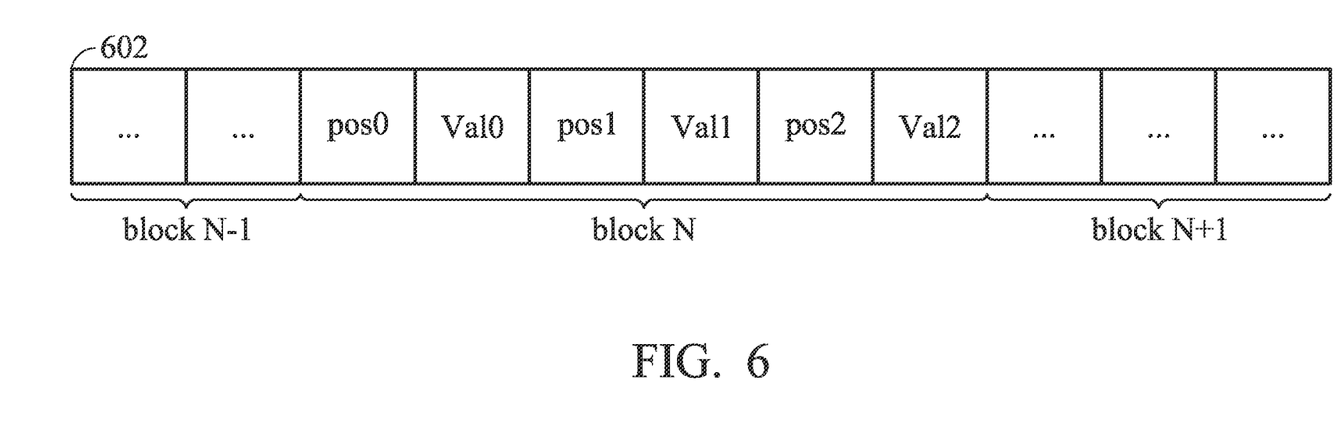

In some embodiments, the position information and the coefficient values of the non-zero coefficients can be stored together, wherein the block position information and the coefficient values corresponding to the non-zero coefficients are stored into a same data array of the storage device 102. For example, refer to FIG. 6, which is a schematic diagram illustrating another embodiment of stored data of the invention. As shown in FIG. 6, the data array 602 is used to store the block position information and the coefficient values of the non-zero coefficients decoded from every block, wherein the block position information and the coefficient values of all the blocks are continuously stored. In this embodiment, if subsequent reconstruction procedures are to be performed, the processor 104 may refer to the data array 602 and reconstruct the residual blocks according to the auxiliary message.

Figure 7:
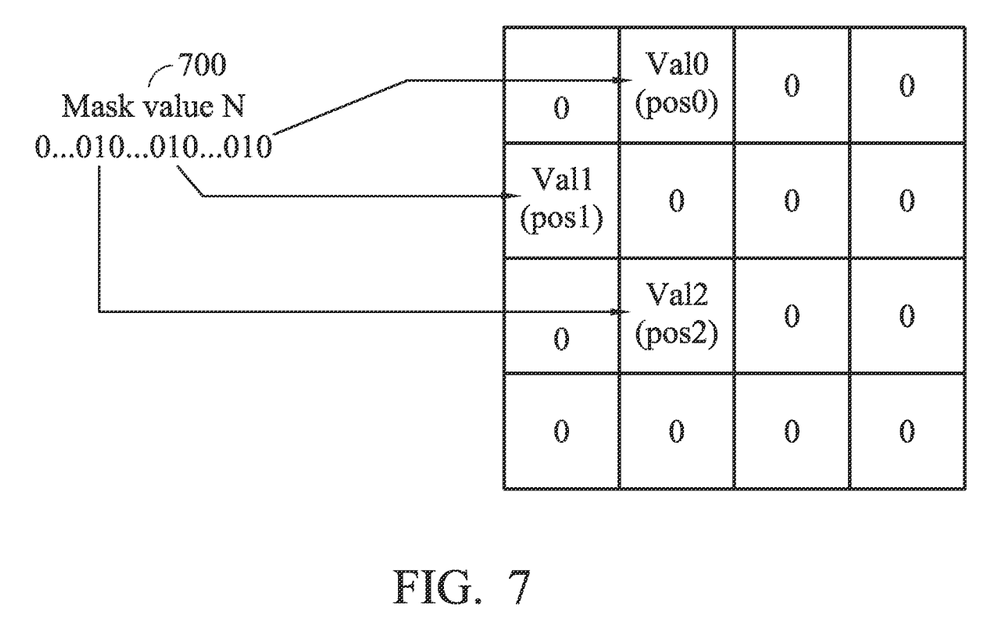

In some embodiments, the coefficient values of the non-zero coefficients are stored in one of the data arrays in the storage device 102 while the block position information of the non-zero coefficients can be represented by a mask value corresponding to the block size of the block to be decoded. In particular, the number of bits corresponds to the total number of coefficients, which correspond to the blocks to be decoded, covers the block position information of the non-zero coefficients, and the corresponding bits are represented as bit value "1". For example, refer to FIG. 7, which is a schematic diagram illustrating another embodiment of stored data of the invention. As shown in FIG. 7, the data array is used to store the coefficient values of the non-zero coefficients decoded from every block, wherein the coefficient values of all the blocks are stored continuously, while the block position information corresponding to the non-zero coefficients can be represented by a mask value 700 corresponding to the block size of the block to be decoded. Taking a block N with the block size of 4×4 pixels as an example, the block N in the data array includes three non-zero coefficients, the coefficient values of which are Va10, Va11, and Va12, respectively. Their block positions are pos0 (e.g., position 1), pos1 (e.g., position 4), and pos2 (e.g., position 9). Thus, the corresponding mask value 700 of the block N can be a 16-bit value. Moreover, bits 1, 4, and 9 of the mask value 700 are set as a bit value "1", which is used to indicate that block N's bit positions containing non-zero coefficients. That is, the mask value 700 is set as "0000001000010010". Thereafter, if subsequent reconstruction procedures are to be performed, the processor 104 may refer to the data array and the mask value 700 "0000001000010010" to write coefficient values Va10, Va11, and Va12 into bit positions pos0, pos1, and pos2 respectively, so as to reconstruct the residual blocks shown in FIG. 4.

In some embodiments, the block position information and coefficient values corresponding to the non-zero coefficients may further be performed a bit compression operation to compress the coefficient values of the non-zero coefficients into a fixed number of bits and compress the position information to bits that conform to the block size so as to further reduce the storage space needed. For example, if each block is with a size of 4×4 pixels, the first data can be the 16-bit data used to store the specific coefficient value of one of the non-zero coefficient decoded from the block N and the corresponding block position information, wherein the coefficient value of the high 12 bits of the first data is represented as binary (for example: 1 bit of the positive and negative sign and 11-bit data), while low 4 bits represents block position information in binary. Thereafter, when subsequent reconstruction procedures are required, the processor 104 can decompress the first data of the non-zero coefficient to obtain a decompressed result with a coefficient value Va10 and block position information pos0, and then write the coefficient value Va10 into the position pos0 of the block N to reconstruct the corresponding residual block.

In some embodiments, prior to being stored in the storage device 102, an inverse Zig-Zag (IZZ) scanning is further performed on the block position information corresponding to the non-zero coefficients to obtain a IZZ-scanned data and the IZZ-scanned data is then stored or an inversion quantization (IQ) operation is further performed on the coefficient values corresponding to the non-zero coefficients and the inverse-quantized data is then stored, so as to further reduce the storage space needed. In one embodiment, the block position information corresponding to the stored non-zero coefficients can be position information obtained after performing the inverse Zig-Zag scanning on the block position information corresponding to the non-zero coefficients that are decoded by the entropy decoding operation. In another embodiment, the coefficient values corresponding to the stored non-zero coefficients are coefficient values obtained after performing the inverse quantization operation on the coefficient values that are decoded by the entropy decoding operation. In general, the inverse Zig-Zag scanning and the inverse quantization operation will be performed only after completing the reconstruction procedures of entropy decoding. However, the image decoding method of the invention can selectively complete the inverse Zig-Zag scanning and the inverse quantization operation in advance, thus effectively distributing the loading of the decoding procedures and accelerating subsequent reconstruction procedures. For example, if the processor 104 is made up of multi-core processor or multiple processors, the various steps of the decoding procedures can be distributed to different cores or processors for execution. Through the distribution of the abovementioned decoding procedure loadings, subsequent reconstruction procedures can be accelerated, thereby effectively enhancing the decoding speed.

Therefore, the image decoding methods and related image decoding devices of the invention can classify the coefficients that underwent entropy decoding and store only the non-zero coefficients while skipping the storing of the large number of zero-coefficients so that the storage space needed can be reduced and the coefficient access mode after entropy decoding can be improved, thereby effectively reducing the bandwidth requirement between the processor and external storage device. Furthermore, the image decoding methods are applicable for most video-formatted image and picture decoding, thus effectively reducing the amount of data reading from or writing to the external storage device and enhancing the decoding speed.

Image decoding methods, or certain aspects or portions thereof, may take the form of a program code (i.e., executable instructions) embodied in tangible media, such as floppy diskettes, CD-ROMS, hard drives, or any other machine-readable storage medium, wherein, when the program code is loaded into and executed by a machine such as a computer, the machine thereby becomes an apparatus for practicing the methods. The methods may also be embodied in the form of a program code transmitted over some transmission medium, such as electrical wiring or cabling, through fiber optics, or via any other form of transmission, wherein, when the program code is received and loaded into and executed by a machine such as a computer, the machine becomes an apparatus for practicing the disclosed methods. When implemented on a general-purpose processor, the program code combines with the processor to provide a unique apparatus that operates analogously to application-specific logic circuits.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalent.

What is claimed is:

1. An image decoding method, comprising:
   acquiring an input bitstream corresponding to an image;
   performing an entropy decoding operation on data of a block to be decoded in the input bitstream to obtain a decoding result, wherein the decoding result includes at least one coefficient having a corresponding block position information and coefficient value;
   determining whether the coefficient value of the at least one coefficient is zero;
   when the coefficient value of the at least one coefficient is not zero, determining the at least one coefficient as an non-zero coefficient and storing the block position information and coefficient value corresponding to the non-zero coefficient to a storage device; and
   when the coefficient value of the at least one coefficient is zero, not storing the block position information and coefficient value corresponding to the at least one coefficient;
   wherein the block position information corresponding to the non-zero coefficient is represented by a mask value, and wherein the number of bits for the mask value corresponds to the total number of coefficients for the block to be decoded and the bit position for the block position information of the non-zero coefficient is represented by bit value "1" in the mask value.

2. The image decoding method of claim 1, further comprising:
   generating auxiliary message corresponding to the block to be decoded; and
   performing a reconstruction operation for reconstructing the image according to the auxiliary message and the block position information and the coefficient value corresponding to the stored non-zero coefficient.

3. The image decoding method of claim 1, wherein the external storage device further includes a first data array and a second data array, and the block position information corresponding to the non-zero coefficient is stored in the first data array and the coefficient value corresponding to the non-zero coefficient is stored in the second data array.

4. The image decoding method of claim 3, wherein the block position information and the coefficient value corresponding to the non-zero coefficient are stored in one of the data arrays of the storage device.

5. The image decoding method of claim 1, wherein a bit compression operation is further performed on the block position information and the coefficient value corresponding to the non-zero coefficient prior to storing the block position information and the coefficient value corresponding to the non-zero coefficient.

6. The image decoding method of claim 4, wherein the block position information corresponding to the stored non-zero coefficient is position information obtained after performing an inverse Zig-Zag scanning on the block position information corresponding to the non-zero coefficient that is decoded by the entropy decoding operation.

7. The image decoding method of claim 4, wherein the coefficient value corresponding to the stored non-zero coefficient is a coefficient value obtained after performing an inverse quantization operation on the coefficient value that is decoded by the entropy decoding operation.

8. An image decoding device, comprising:
a storage device; and
at least one processor, acquiring an input bitstream corresponding to an image,
performing an entropy decoding operation on data of a block to be decoded in the input bitstream to obtain a decoding result, wherein the decoding result includes at least one coefficient having a corresponding block position information and coefficient value, determining whether the coefficient value of the at least one coefficient is zero, when the coefficient value of the at least one coefficient is not zero, determining the at least one coefficient as an non-zero coefficient and storing the block position information and coefficient value corresponding to the non-zero coefficient to the storage device, and when the coefficient value of the at least one coefficient is zero, not storing the block position information and coefficient value corresponding to the at least one coefficient,
wherein the block position information corresponding to the non-zero coefficient is represented by a mask value, and wherein the number of bits for the mask value corresponds to the total number of coefficients for the block to be decoded and the bit position for the block position information of the non-zero coefficient is represented by bit value "1" in the mask value.

9. The image decoding device of claim 8, wherein the processor further generates auxiliary message corresponding to the block to be decoded and performs a reconstruction operation for reconstructing the image according to the auxiliary message and the block position information and the coefficient value corresponding to the stored non-zero coefficient.

10. The image decoding device of claim 8, wherein the storage device further includes a first data array and a second data array, and the block position information corresponding to the non-zero coefficient is stored in the first data array and the coefficient value corresponding to the non-zero coefficient is stored in the second data array.

11. The image decoding device of claim 8, wherein the processor further stores the block position information and the coefficient value corresponding to the non-zero coefficient in one of the data arrays of the storage device.

12. The image decoding device of claim 11, wherein a bit compression operation is further performed on the block position information and the coefficient value corresponding to the non-zero coefficient prior to storing the block position information and the coefficient value corresponding to the non-zero coefficient.

13. The image decoding device of claim 11, wherein the block position information corresponding to the stored non-zero coefficient is position information obtained after performing an inverse Zig-Zag scanning on the block position information corresponding to the non-zero coefficient that is decoded by the entropy decoding operation.

14. The image decoding device of claim 11, wherein the coefficient value corresponding to the stored non-zero coefficient is a coefficient value obtained after performing an inverse quantization operation on the coefficient value that is decoded by the entropy decoding operation.

* * * * *